Patented Aug. 16, 1949

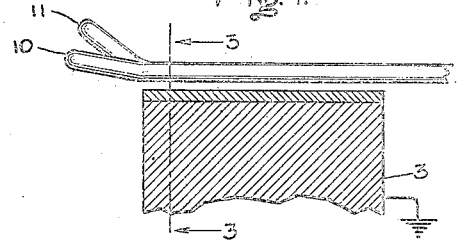
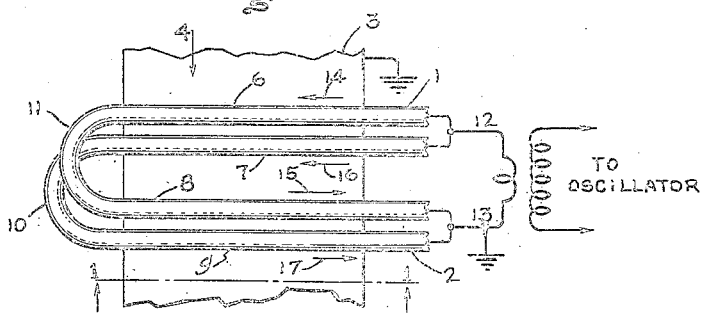
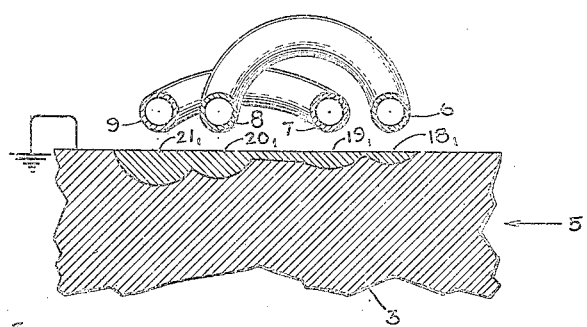
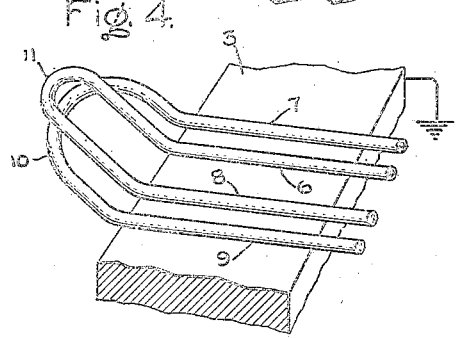

2,479,341

UNITED STATES PATENT OFFICE 2,479,341

INDUCTION HEATING APPARATUS

Richard A. Gehr, Scotia, and Herbert W. Secor, Ballston Spa, N. Y., assignors to General Electric Company, a corporation of New York Application March 16, 1948, Serial No. 15,136

2 Claims. (Cl. 219—47)

Our invention relates to induction heating apparatus, more particularly to induction heating for the continuous hardening of metal parts, and has for its object a simple, reliable and compact induction heating apparatus.

More specifically our invention relates to the continuous surface heating and hardening of massive metal parts such as the rails or ways on lathe beds by means of high frequency induction heating wherein the workpiece and the heating coils are moved relative to each other so as progressively to heat a surface layer of the workpiece. After such heating, the metal is separately quenched or is allowed to cool by internal conduction and dissipation of heat into the large body of the workpiece which occurs quickly as the heated area passes beyond the heat source.

Shallow surface hardening is comparatively simple with a hairpin coil conforming to the contours of the workpiece to be hardened. When a single hairpin coil is used, the source of heat is the two straight line elements of the coil, and the quantity of heat distributed is limited by the temperature induced by the coils. Such temperature must remain below the burning temperature of the metal of the workpiece. For this reason, the limit of hardness depth obtainable with a single coil is 20–30 mils.

The object of our invention is to provide an improved inductive heating apparatus that will induce the heat necessary to secure hardness in metals at depths in excess of 30 mils. Since the depth of penetration depends upon the quantity of heat per unit area imparted to the workpiece, this desirable result can be accomplished by an increase of the induction of heat per unit area in the workpiece by the heating apparatus.

To gain such a concentration the number of line sources of heat per unit area is increased. Although the temperature induced by the resulting effective plane source of heat is still limited by the burning temperature of the metal of the workpiece, the heat inducted per unit area is increased since it is proportionate to the number of coils in that area.

Our invention accomplishes this desirable result by mounting two or more coils in parallel to increase the concentration of heat induction. Previously in the art, two such coils have been operated in parallel, but they have been used to heat separate areas and not in the additive manner of our invention.

In accordance with our invention, we employ specially shaped hairpin coils connected in parallel to complete the circuit from a radio frequency generator and transformer. The straight elements of all the coils are disposed in a plane parallel to the workpiece. The coils are made longer than the width of the work to be treated, and of substantially equal length to insure that the load will divide substantially equally between them. To avoid physical interference and also to prevent burning of the edge of the workpiece, the curve ends of the coils are bent out of the common plane in varying amounts.

For a more complete understanding of our invention reference is made to the accompanying drawing of one embodiment of our invention. Fig. 1 is a section taken along the line 1—1 of Fig. 2 just after leaving the coils and just before quenching, the heated area is reverse crosshatched for contrast. Fig. 2 is a view of the parallel connected coils in relation to the workpiece and the connection to a transformer and an oscillator is indicated. The workpiece 3 moves in the direction of the arrow 4. Fig. 3 is a magnified view of the section 3—3 of Fig. 1 looking in the direction of the arrows. The workpiece 3 moves in the direction of the arrow 5. Fig. 4 is a view, in perspective, of a modification of the device of Figures 1, 2 and 3.

Referring to the drawing, my invention in one form using two heating coils 1 and 2 is shown as applied to the surface heating and hardening of a massive workpiece 3 to a depth greater than can be accomplished by a single coil. The workpiece surface is heated by interpositioned parallel connected hairpin shaped coils formed from electrically conducting hollow or tubular material such as ¼" copper tubing. The straight elements of the coils 6, 7, 8 and 9 are parallel to each other and disposed in a common plane. This interpositioning, as in Fig. 2, may consist either of one straight member of one coil 8 disposed between the two straight members of the other coil 7 and 9 or, alternately as in Fig. 4, with both straight members 6 and 8 of one coil disposed between the two straight members 7 and 9 of the other coil. The coils are of substantially equal impedance to share the load substantially equally between them and are made with the straight elements of the coils at least as long as the width of the workpiece. The curve ends of the coils 10 and 11 are bent out of the common plane and away from the work both to prevent physical interference between the coils and to prevent burning of the edge of the work. The amount and position of such bending is determined empirically for each installation.

The workpiece and the heating coils are mounted on suitable supporting means (not shown) for relative movement with each other. During the heating operation the common plane of the coils passes continuously at uniform scanning speed along the surface of the workpiece in parallel spaced relation therewith. The relative movement between heater and workpiece is in the lengthwise direction of the workpiece and hence transversely of the coils. We prefer to move the workpiece rather than the coils to avoid the high power losses incidental to the use of flexible leads which would be necessitated by moving the coils. The scanning speed can be comparatively slow since the use of a plurality of coils affords a greater rate of heat induction in the workpiece at a temperature below the burning temperature of the workpiece metal than can be accomplished by the use of a single coil heater.

In the heating operation current is supplied to the coils from supply connections 12 and 13 at a suitably high frequency such as 540,000 cycles per second. The voltage on the secondary side of the transformer between the leads 12 and 13 of the order of 40 volts and the lead 13 is grounded. A cooling fluid, preferably water, is circulated through the hollow conductors of the coils as indicated by the pairs of arrows 14, 15 and 16, 17 denoting direction of flow, for the purpose of cooling the coils.

The progressive heating of the surface of the workpiece is indicated in Fig. 3 to show graphically the progressive penetration of heat as the workpiece passes under the successive coils. A magnified section is used and the heated area is reverse crosshatched for contrast. Travelling in the direction of arrow 5 the workpiece first contacts the straight element 6 and has induced in it the heat represented by the area 18. Moving along, the workpiece has more heat induced in it by straight element 7 increasing the heat in the workpiece to an amount as represented by the area 19. More heat is induced by the straight elements 8 and 9 and the successive accumulations are represented by the sections 20 and 21. If but a single coil were used the heat induced under the first element would be represented by area 18 and the total by area 19. Since the heat induced in the workpiece is always at a temperature lower than the burning temperature of its metal, the workpiece can be driven at any speed without fear of damage to the work. Because a slow speed is possible and also because of the increase in number of inductors, much more heat can be induced in the workpiece than is possible to induce with a single inductor coil, causing the workpiece to be heated to a greater depth and, therefore, resulting in a greater hardness depth after quenching.

Quenching of the workpiece is accomplished after the workpiece passes the coils. Water is applied to the workpiece immediately beyond a screen (not shown) mounted next to the straight coil member 9.

What we claim as new and desire to secure by Letters Patent of the United States is:

1. Induction heating apparatus for progressively heating a metal workpiece upon relative movement with respect to said workpiece, comprising two hairpin-shaped high frequency induction heating coils interpositioned with corresponding elements of said coils in adjacent parallel relation, a closed end portion on one of said coils shaped so as to extend above the closed end portion of the other coil in spaced relation therewith, and electrical connections for connecting the ends of said adjacent elements together to opposite terminals of a high frequency supply source so that said coils are connected electrically in parallel with each other, said coils being constructed with substantially equal impedances for substantially equal currents in said elements and said currents being in the same direction in said adjacent elements so that heat is generated cumulatively in a surface layer of the workpiece by said parallel elements as they pass successively over the surface of the workpiece in parallel relation thereto.

2. Induction heating apparatus for progressively heating a metal workpiece upon relative movement with respect to said workpiece, comprising two substantially similar hairpin-shaped high frequency induction heating coils provided each with two substantially parallel elements, said coils being interpositioned with an element of each coil between the two elements of the other coil and corresponding elements of said coils in adjacent parallel relation, a closed end portion on one of said coils bent away from the other coil so as to pass over the closed end portion of said other coil in overlapping spaced relation therewith, and electrical connections for connecting the ends of said adjacent elements together to opposite terminals of a high frequency supply source so that said coils are connected electrically in parallel with each other, said coils being constructed with substantially equal impedances for substantially equal currents in said elements and said currents being in the same direction in said adjacent elements so that heat is generated cumulatively in a surface layer of the workpiece by said parallel elements as they pass successively over the surface of said workpiece in parallel relation thereto.

RICHARD A. GEHR.
HERBERT W. SECOR.

REFERENCES CITED

The following references are of record in the file of this patent:

UNITED STATES PATENTS

| Number | Name | Date |
|---|---|---|
| 1,900,842 | Northrup | Mar. 7, 1933 |
| 2,024,906 | Bennett | Dec. 17, 1935 |
| 2,419,116 | Cassen et al. | Apr. 15, 1947 |

OTHER REFERENCES

Curtis, "High Frequency Induction Heating," McGraw-Hill Book Company, Inc., published 1944, pages 45, 75 and 76. (First Edition.)